United States Patent
Peterman et al.

(10) Patent No.: US 7,685,413 B2
(45) Date of Patent: Mar. 23, 2010

(54) USE DRIVEN CONFIGURATOR AND SYSTEM OPTIMIZATION

(75) Inventors: Anthony E. Peterman, Austin, TX (US); Ryan M. Garcia, Austin, TX (US); Chad R. Anson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 695 days.

(21) Appl. No.: 11/555,306

(22) Filed: Nov. 1, 2006

(65) Prior Publication Data

US 2008/0104379 A1    May 1, 2008

(51) Int. Cl.
*G06F 9/445* (2006.01)
(52) U.S. Cl. .................. 713/1; 713/2; 713/100
(58) Field of Classification Search .......... 713/1, 713/2, 100
See application file for complete search history.

(56) References Cited

U.S. PATENT DOCUMENTS

| | | | |
|---|---|---|---|
| 4,885,684 A * | 12/1989 | Austin et al. | 717/149 |
| 5,991,543 A | 11/1999 | Amberg et al. | 395/712 |
| 5,995,757 A | 11/1999 | Amberg et al. | 395/712 |
| 6,038,367 A * | 3/2000 | Abecassis | 386/46 |
| 6,167,383 A | 12/2000 | Henson | 705/26 |
| 6,182,275 B1 | 1/2001 | Beelitz et al. | 717/1 |
| 6,236,901 B1 | 5/2001 | Goss | 700/95 |
| 6,327,706 B1 | 12/2001 | Amberg et al. | 717/11 |
| 7,006,985 B1 * | 2/2006 | Dean et al. | 705/26 |
| 7,475,000 B2 * | 1/2009 | Cook et al. | 703/14 |
| 2008/0059321 A1 * | 3/2008 | Zucker et al. | 705/26 |
| 2008/0195952 A1 * | 8/2008 | Ewing et al. | 715/735 |

OTHER PUBLICATIONS

Alienware Alienware recommends Windows Vista™ Ultimate. http://www.alienware.com/main_gaming.aspx?cs=1, Feb. 28, 2007, (3 pages).

* cited by examiner

*Primary Examiner*—Nitin C Patel
(74) *Attorney, Agent, or Firm*—Hamilton & Terrile, LLP; Stephen A. Terrile

(57) ABSTRACT

A configurator is provided with the ability to present a customer with information regarding desirable configuration bundles that are based upon specific intended use and to enable a customer to configure a system based upon the specific intended use. Additionally, based upon an indicated specific intended use, an information handling system manufacturer can optimize the configuration of the information handling system.

12 Claims, 5 Drawing Sheets

USE DRIVEN CONFIGURATOR AND SYSTEM OPTIMIZATION

BACKGROUND OF THE INVENTION

1. Field of the Invention

The present invention relates to configuring information handling system and more particularly to use driven configuration and system optimization.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to sell information handling systems online, often with a configuration system that allows for the selection of components and their associated prices. When allowing a customer to configure an information handling system, it is known to offer bundles of components that are oriented to general areas of intended use. For example, a certain preselected bundle of components might be presented for gaming or another preselected bundle of components might be presented for photographic projects while yet another preselected bundle of components may be presented for video editing.

However, certain general areas of use can include many specific areas of use. For example, gaming is a general area of intended use (i.e., a market component) for information handling system suppliers which can include a plurality of gaming market subcomponents (i.e., a specific intended use). Often the information handling system needs of one gaming market subcomponent can differ from the needs of another gaming market subcomponent. Additionally, it is often desirable to optimize an information handling system to be optimized for a particular gaming market component or subcomponent. Accordingly, upon receipt of a newly configured information handling system, certain groups of gamers often reinstall components, such as the operating system, with only essential elements or remove other software to realize all of the potential performance of the new information handling system. There are also a number of available applications that allow a user to view the various components loaded at start-up of the system and to selectively deactivate those components the user believes are not needed Gaming is one example of many potential areas of use in which users optimize their systems in this manner for the tasks they intend to perform. These other areas may include areas like video editing, audio editing, digital photography, computer-aided design, and even office productivity applications like spreadsheet applications.

Manufacturers of information handling systems may be motivated to optimize systems for the benefit of users prior to providing the systems to users. Some manufacturers provide systems pre-optimized or tuned for certain anticipated applications. An example is Alienware, which pre-optimizes systems for running certain gaming related benchmarks and provides the benchmark scores to its customers. However, an issue is present to manufacturers of information handling systems that can prevent the removal of certain components or portions of components of the information handling system as that removal could violate licensing or other agreements with the supplier of the component. For example, removal or modification of components of the operating system may violate an agreement or system certificates between the manufacturer of the information handling system and the supplier of the operating system. Further, an issue is present that the manufacturer may optimize for a general use and not for a specific use by an end user.

It would be desirable to provide a customer with the ability to obtain information about desirable component bundles that are based upon specific intended use. Additionally, it would be desirable to configure an information handling system which is optimized for a specific intended use.

SUMMARY OF THE INVENTION

In accordance with the present invention, a configurator is provided with the ability to present a customer with information regarding desirable configuration bundles that are based upon specific intended use and to enable a customer to configure a system based upon the specific intended use. Additionally, based upon an indicated specific intended use, an information handling system manufacturer can optimize the configuration of the information handling system.

More specifically, in one embodiment, the invention relates to a method for optimizing an information handling system for an intended use. The method includes maintaining a list of applications installed on the information handling system during an initial system load, the applications relating to the intended use; determining which system components are necessary for the applications to operate properly; compiling a core list of core system components for all of the applications contained on the list of applications installed on the information handling system; assigning remaining system components to a virtualization list; and, operating the information handling system in an intended use optimized mode of operation.

In another embodiment, the invention relates to a method for configuring an information handling system. The method includes configuring the information handling system with options selected according to user input. The configuring includes validating configuration of the information handling system; and, providing component bundle information based upon specific uses selected by the user during configuration of the information handling system.

In another embodiment, the invention relates to a method for use selectable configuration of an information handling system. The method includes loading an application onto the information handling system, the application being operable to identify core and non-core resources for at least one specific intended use; executing the application to provide a user selectable option for optimization; and, disabling non-core resources responsive to a user selection of the at least one specific intended use.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
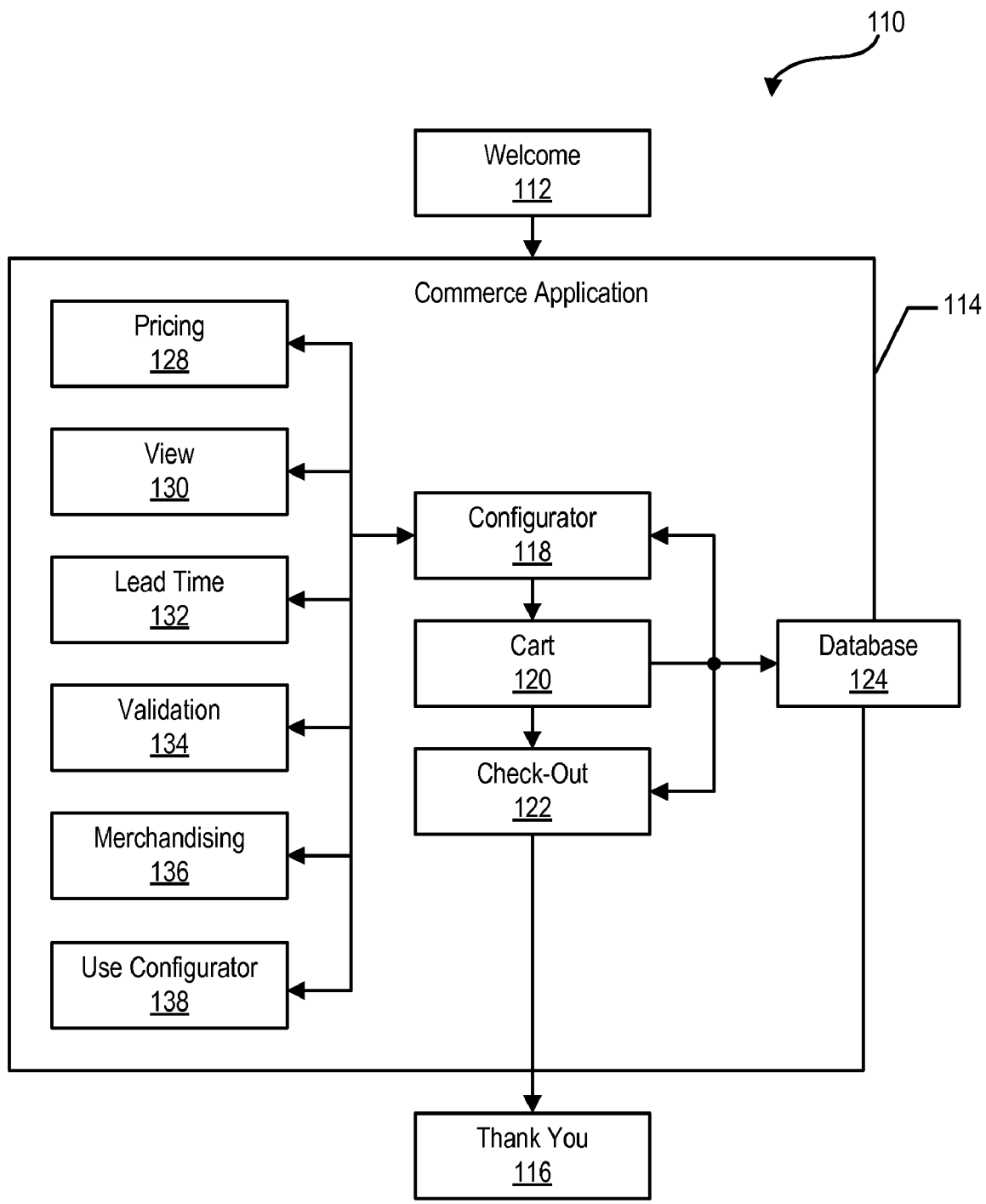
FIG. 1 shows an overview block diagram representation of one embodiment of an on-line store.

FIG. 1 shows an overview block diagram representation of one embodiment of an on-line store. An online store is one component of a website to which a customer may go to configure a particular information handling system, for example, according to desired options of the customer. In this embodiment, the online store is typically a subset of a larger Internet website. At the website online store, a customer can select one or more products in which the customer is interested. Upon selection of a particular product, the online store presents the customer with the ability to go to the product information for the particular product, customize the product, price the customized product, purchase the product, and other actions as discussed herein. While shopping happens in the website (i.e., selection of a particular kind of system by a customer), when the customer is ready to purchase a customized system, the customer is then directed to that part of the website which the online store application controls.

Referring now to the embodiment of FIG. 1, an online store 110 for use in generating customer configured information handling systems, e.g., customer configured computer systems, is shown. The online store 110 includes a welcome or introductory module 112, a commerce application module 114, and a thank you module 116. The online store 110 includes an online store user interface which enables the system configuration, pricing, and ordering of an information handling system via the Internet. The commerce application 114 includes a configurator 118, shopping cart 120, a checkout module 122, a services activation module 123 and database 124. The database 124 provides information to the configurator 118, shopping cart 120, checkout module 122. The configurator 118 includes a pricing module 128, a view module 130, a lead time warning module 132, a validation (or compatibility) warning module 134, a merchandising module 136 and a use configuration module 138. The various modules of the configurator 118 are driven by data from the database 124, and thus the configurator 118, shopping cart 120, and checkout module 122 are all linked to the database 124.

In operation of the online store 110, the welcome module 112 presents a welcome page 112, the configurator 118 presents a configurator page, the shopping cart 120 presents a shopping cart page, the checkout module 122 presents a checkout page, and the thank you module 116 presents a thank you page. The welcome page includes a static page and generally resides outside of the commerce application 114.

The configurator page, shopping cart page, and checkout page are within the commerce application and use information provided by the database. The checkout includes a payment feature, delivery feature, personal verses business feature, and instructional text features (i.e., how to fill out an online form.)

The welcome page is typically an introductory page and includes a link into the online store 110. The welcome page is typically a static welcome page. Upon completion of configuration of a system, the customer is transferred to a checkout page. After completion of the checkout, the customer is transferred to a static thank you page 116. The thank you page 116 provides a message of gratitude to the customer for having placed the order or for visiting the online store.

Aspects of the configurator 118 which interact with database 124 are shown in FIG. 1. In essence, the entire commerce application 114 interacts with the database. The configurator 118, shopping cart 120, and checkout module 122 are each part of the commerce application 114 and interact with the database 124. For example, with the shopping cart 120, additional merchandising information associated with a particular system which has been configured and placed in the shopping cart by an online store customer can be provided.

The use configuration module 138 provides the configurator 118 with the ability to present to a user a configurator which presents a customer with information regarding desirable configuration bundles that are based upon a specific intended use and to enable a customer to configure a system based upon the specific intended use. The use configuration module 138 interacts with the database 124 to obtain information regarding specific intended uses and present this information to the customer.

Figure 2:
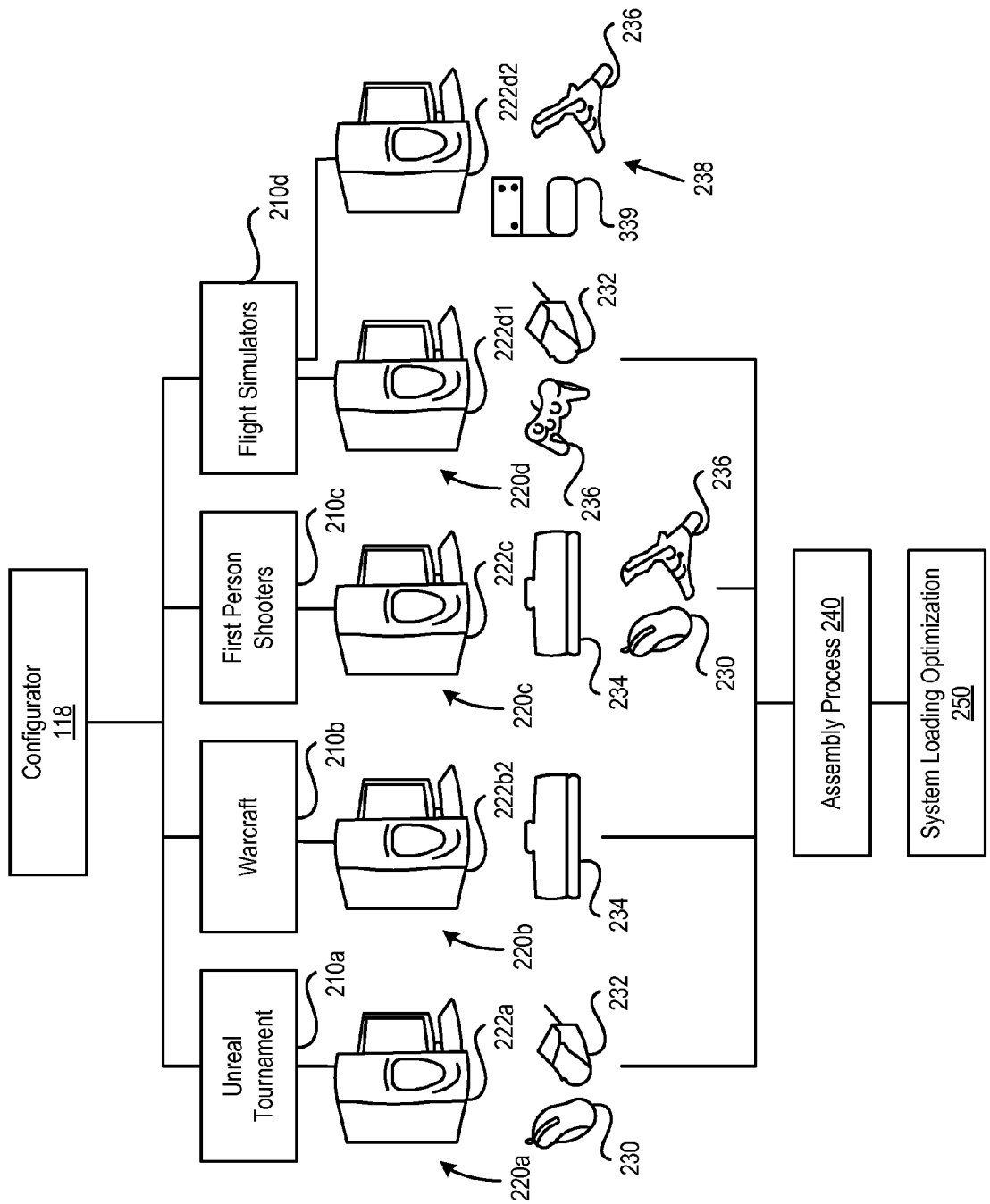
FIG. 2 shows a flow diagram of one embodiment of presenting a customer with configuration bundles based upon specific intended user.

FIG. 2 shows a flow diagram of one embodiment of presenting a customer with configuration bundles based upon specific intended use. More specifically, when a customer accesses the configurator 118, the customer is presented with an option of identifying a specific intended use for an information handling system to be configured. For example, in the general area of use of gaming (i.e., in the gaming context), a user may be presented with a number of specific intended uses 210. The specific intended uses 210 can include specific games (e.g., the Unreal Tournament game 210a available from Epic Games or the World of Warcraft game 210b available from Blizzard Entertainment.) The specific intended uses 210 can also include specific genres of games (e.g., a first person shoot genre 210c or a flight simulator genre 210d.)

Each specific intended use 210 includes at least one suggested configuration bundle 220. For example, the specific game 210a might include a bundle which includes a certain information handling system configuration 222a as well as suggested controllers such as a mouse 230 as well as a game mouse 232. The specific game 210b might include a bundle which includes a certain information handling system configuration 222b as well as suggested controllers such as a game enhanced keyboard 234. The specific genre of game 210c might include a bundle which includes a certain information handling system configuration 222c as well as suggested controllers such as a game enhanced keyboard 234, a particular mouse 230 and a joystick 236. The specific genre of game 210d might include a bundle which includes a certain information handling system configuration 222d1 as well as suggested controllers such as a game pad 236 and a game mouse 232. Additionally, the specific genre of game 210 might also include a suggested bundle which includes a certain information handling system configuration 222d2 as well as suggested controllers such as a flight control system 238 which could include a specific type of joystick 236 as well as a throttle 239.

When a user selects a particular suggested component bundle, the assembly process assembles an information handling system which includes the components included within the selected bundle at step 240. Additionally, the information handing system is configured to include an optimized portion which is optimized for the particular specific intended use at step 250. It should be understood that although this embodiment has been described with respect to an online process, a user could indicate intended uses and select component bundles through other ordering processes, including but not limited to telephone and in person orders.

Figure 3:
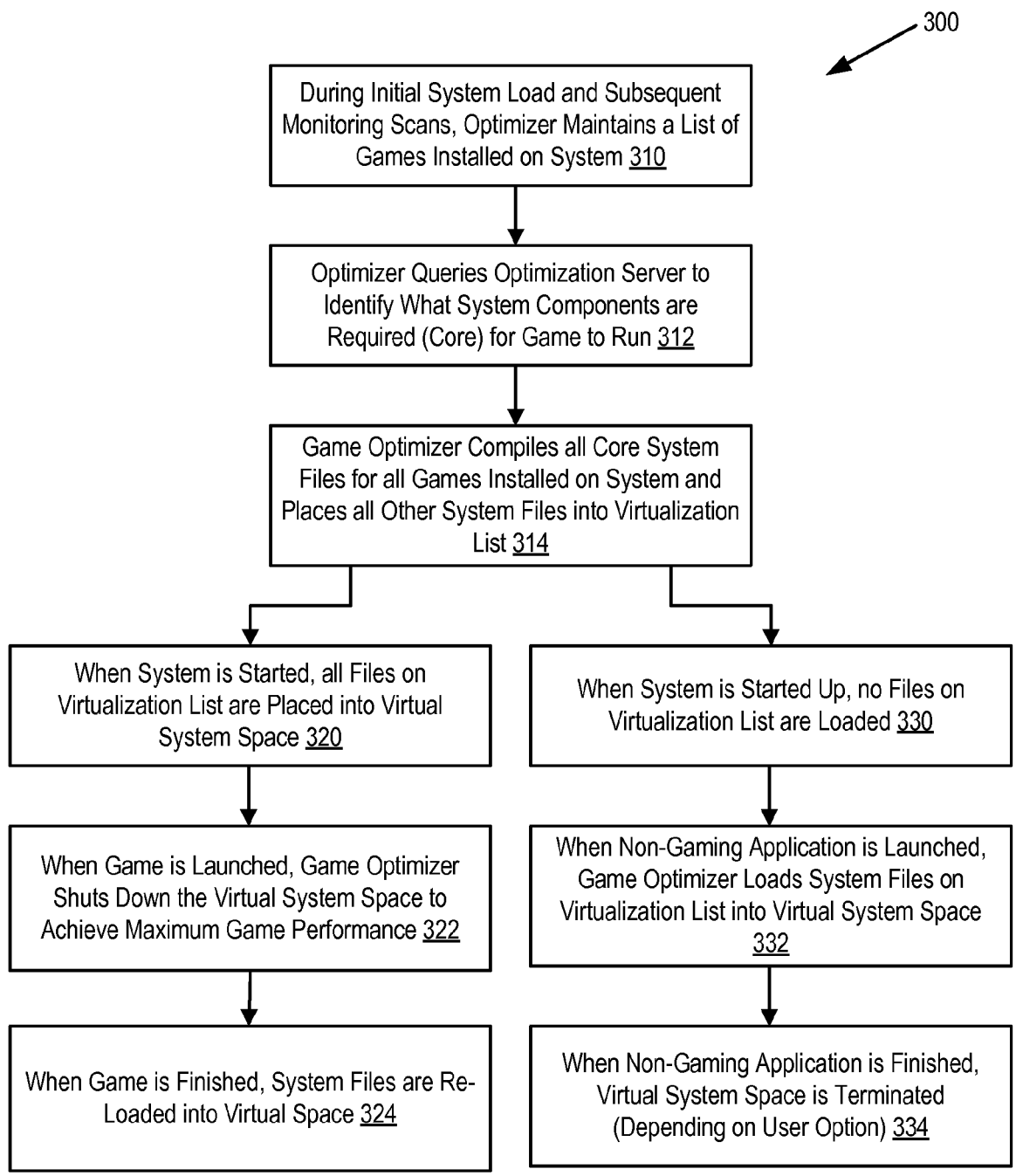
FIG. 3 shows a flow diagram of one embodiment of process for optimizing an information handling system for an intended use.

FIG. 3 shows one embodiment of a flow diagram of process 300 for optimizing an information handling system for a specific intended use. In this embodiment, more specifically, during an initial system load (as well as subsequent monitoring scans) an optimization module maintains a list of games that are installed on the information handling system at step 310. Of course, although games are described as the specific intended use with respect to this embodiment, there could be other specific intended uses such as video editing, audio editing, digital photography, computer-aided design, and even office productivity applications like spreadsheet applications. Next, the optimization module queries an optimization server to identify which system components are required for the game to operate properly (i.e., which components are core) at step 312. Next, the optimization module compiles a list of all core system components, files or other resources for all games that are installed on the information handling system and places all other system components, files or other resources into a virtualization list at step 314.

Next, for a non-game optimized operation, when the system is started, all components, files or other resources that are stored within the virtualization list are placed into a virtual system storage space at step 320. Next, when a game is launched, the optimization module shuts down the virtual system storage space to achieve maximum game performance at step 322. When the game is finished (i.e., after the game is closed), the system components, files or other resources stored within the virtual system storage space are reloaded into the virtual space at step 324. Whether or not the system components, files or other resources stored within the virtual system storage space are reloaded may be a user configurable option.

Alternately, for a game optimized operation, when the system is started, no components, files or other resources on the virtualization list are loaded at step 330. When a non-gaming application is launched, the optimization module loads the system components, files or other resources on the virtualization list into the virtual system storage space at step 332. When the non-gaming application is finished, the virtual system storage space is terminated. Whether or not the virtual system storage space is terminated may be a user configurable option.

Figure 4:
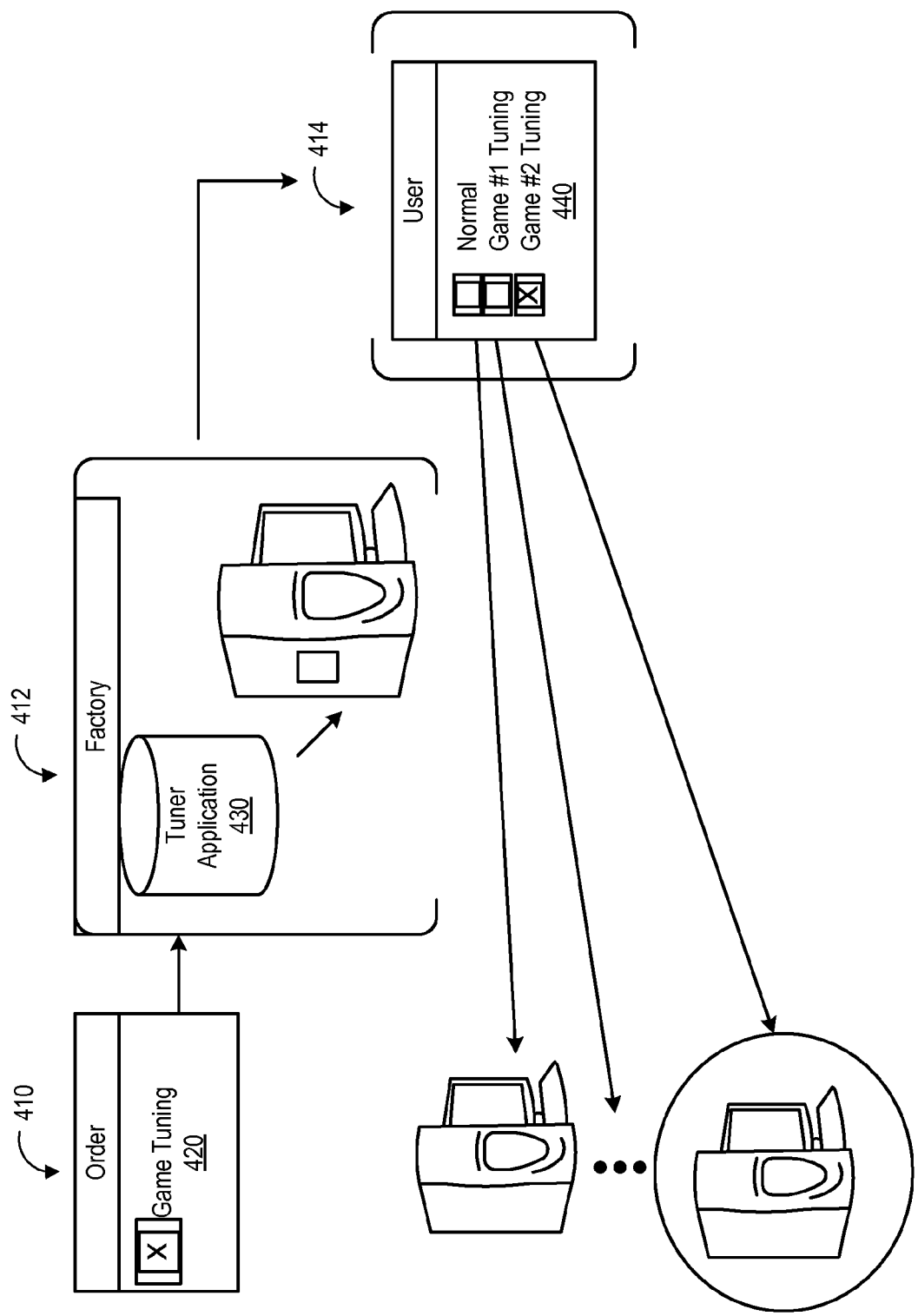
FIG. 4 shows a block diagram of one embodiment of the operation of an information handling system from configuration to use.

FIG. 4 shows a block diagram of one embodiment of a process for allowing user system optimization for a specific intended use of an information handling system. In this embodiment, more specifically, the process includes a configuration portion 410, a fabrication portion 412 and an operation portion 414. It should be understood that, although games are described below as the specific intended use with respect to this embodiment, there could be other specific intended uses such as video editing, audio editing, digital photography, computer-aided-design, and even office productivity applications like spreadsheet applications.

During the configuration portion 410 of the process of FIG. 4, a customer can indicate a desire for the information handling system to be enabled for user selectable system optimization for a specific intended use such as gaming. This option can be presented to a customer, for example, as an upgrade option offered at an additional cost to the customer. One alternative, is for the manufacturer to provide the user with an order option for this upgrade during an online order at step 420. A user could indicate this desire through other ordering processes, including but not limited to telephone and in person orders. If the customer has indicated such a desire, then during the fabrication portion 412, a tuner application 430 is loaded onto the information handling system being fabricated. In this embodiment, the tuning application 430 includes detailed information about the hardware and software components of the system and also about the specific uses of the system planned by the user. Tuning application 430 may provide locally on the system the information discussed above about files and resources that are core and non-core or otherwise configurable to improve operation of the system for certain uses. Tuning application 430 thus operates on the system to provide a similar result from the above discussed system optimization. Further, the fabrication can include configuring the information handling system with separate partitions some of which are tuned for specific gaming use. The fabrication may also involve establishing within the system the capability to load files and resources into virtual storage for handling in accordance with the embodiments discussed above.

After the information handling system is received by the customer, then during operation portion 414, the customer can run the tuning application 430, which can present a user interface 440 to the user with selection options for optimizing the system for one of a plurality of specific intended uses. Through this user selectable optimization, the user can select to operate the information handling system in a normal mode of operation (i.e., a mode where the system operates with standard components, files and resources loaded and executing) or in a tuned or optimized mode of operation (i.e., a mode where only the core components, files and resources for the specific intended use are loaded and executing). The customer can select in which mode to operate via a user interface of the tuner application 430 that is loaded on the information handling system during fabrication of the information handling system. In operation, tuner application 430 can be enabled to connect to a server or other network resource for updating the local information relating to optimization for specific intended use of the system. In this manner, tuner application 430 can be updated with the latest available code version and information about tuning options. Further, it can be enhanced with new tuning options that may not have been available at the time the system was fabricated.

The tuner application 430 provides a number of advantages to a user of the system as well as to the manufacturer of the system. For the manufacturer, tuner application 430 improves performance for a user's specific use of the system while avoiding the necessity to have significant differences between systems and image loads during the fabrication process. The systems for multiple users can include the same hardware and software components, while the user selectable optimization then provides each user with a unique experience and a system tuned to that user's specific intended use or uses of the system. Further, to the extent the manufacturer needs the systems to comply with contractual or certification obligations, the system as shipped when running under the normal optimization can be verified to be compliant. The changes that occur when optimized only occur once at the user's location and when selected by the user. With regard to the user, the advantages include the ability to have one system that is flexible to being optimized for whatever intended use the user selects at a particular point in time. At the same time, the user has the flexibility to return the system to normal operation with standard components, files and resources. Further, by being able to update the tuner application 430, the user can ensure optimization includes the latest information about performance and also factors in new hardware or software within the system.

Figure 5:
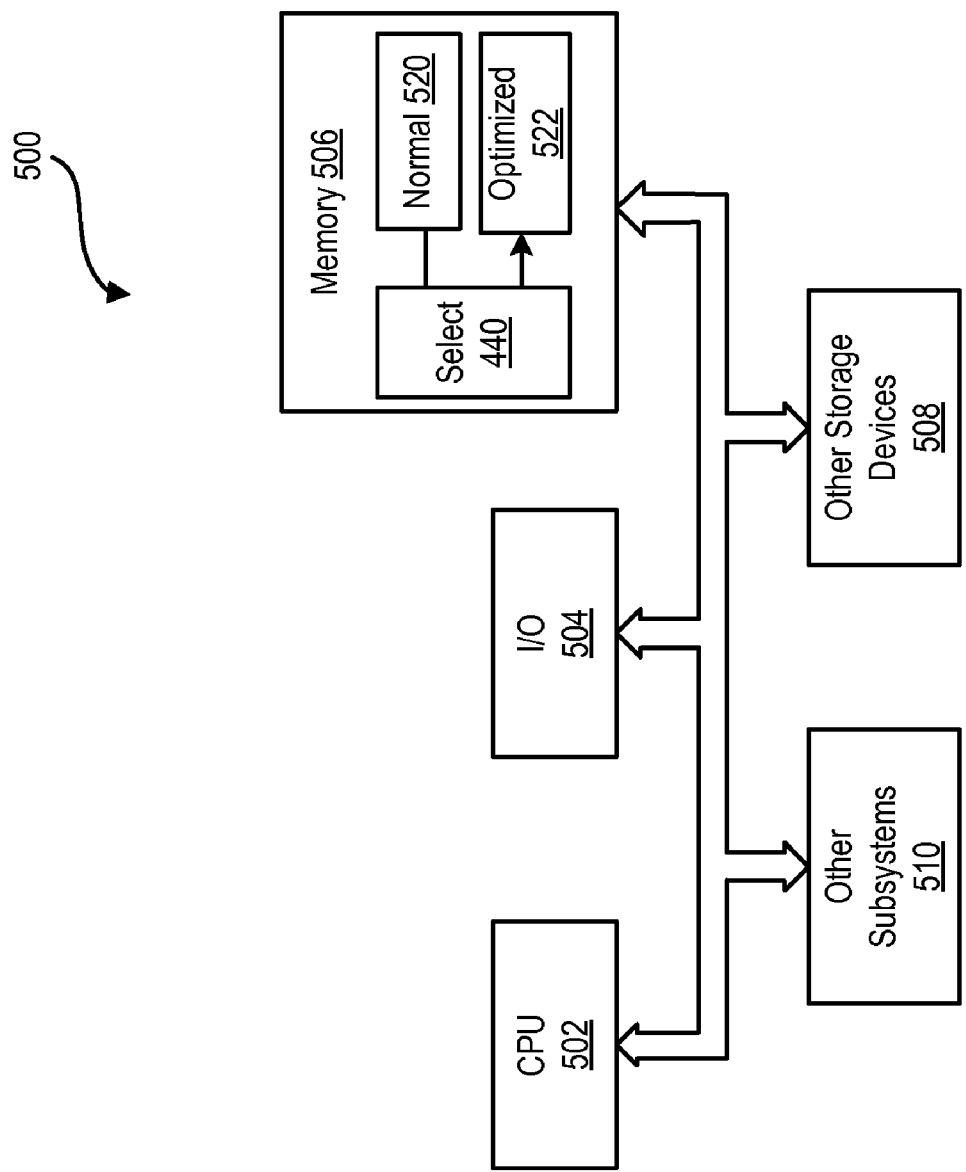
FIG. 5 shows a schematic block diagram of one embodiment of an information handling system.

Referring to FIG. 5, a system block diagram of an information handling system 500 is shown. The information handling system 500 includes a processor 502, input/output (I/O) devices 504, such as a display, a keyboard, a mouse, and associated controllers, memory 506 including non-volatile memory such as a hard disk drive and volatile memory such as random access memory, and other storage devices 508, such as a CD-ROM or DVD disk and drive and other memory devices, and various other subsystems 510, all interconnected via one or more buses, shown collectively as bus 512.

In one embodiment, the non-volatile memory may include a plurality of partitions such as operating system partition 520 and use optimized partition 522 (which is a partition that includes software that is tuned for a particular use). Such partitions 520 and 522 can be used for optimizing system 500 for a specific intended use as described above. The non-volatile memory may also store the tuner application 430 for use in a user selectable optimization as described above.

For purposes of this invention disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, it will be appreciated that other types of intended use information may be presented along with the various configuration selections. Also for example, it will be appreciated that additional optimized partitions may be stored within the information handling systems. Also for example, it will be appreciated that various information may be stored within each of the partitions. Also, for example, while gaming is provided as an example of an intended use that includes subcomponents, it will be appreciated that other intended uses may also include subcomponents for which an information handling system may be configured and optimized.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for optimizing an information handling system for an intended use comprising:
   maintaining, via the information handling system, a list of applications installed on the information handling system during an initial system load, the applications relating to the intended use;
   determining, via the information handling system, which system components are necessary for the applications to operate properly;
   compiling, via the information handling system, a core list of core system components for all of the applications contained on the list of applications installed on the information handling system;
   assigning, via the information handling system, remaining system components to a virtualization list; and,
   operating the information handling system in an intended use optimized mode of operation.

2. The method of claim 1 further comprising:
   loading the system components identified by the virtualization list into a virtual system space; and,
   shutting down the virtual system storage space when operating the information handling system in the intended use optimized mode of operation.

3. The method of claim 1 further comprising:
   loading the system components identified by the virtualization list into a virtual system space; and,
   executing the system components stored on the virtual system storage space when a non-intended use application is executed; and,
   shutting down the virtual system storage space when execution of the non-intended use application completes.

4. The method of claim 1 wherein:
the intended uses include gaming.

5. The system of claim 1 wherein:
the gaming includes specific game titles; and,
the core list of system components is specific to the specific game titles.

6. The system of claim 1 wherein:
the gaming includes specific game genres; and,
the core list of system components is specific to the specific game genres.

7. The method of claim 1 wherein:
the intended use include at least one of audio editing, video editing and photography.

8. A computer implemented method for use selectable configuration of an information handling system, the method comprising:
loading an application onto the information handling system, the application being operable to identify core and non-core resources for at least one specific intended use, the at least one specific intended use including gaming and the gaming including at least one of specific game titles; and,
executing the application to provide a user selectable option for optimization; and,
disabling non-core resources responsive to a user selection of the at least one specific intended use, the core and non-core resource identification is specific to the specific game titles.

9. The method of claim 8 wherein:
the gaming includes specific game genres; and,
core and non-core resource identification is specific to the specific game genres.

10. The method of claim 8 further comprising:
configuring the information handling system with a normal portion and an intended use portion; and wherein
the application is stored within the intended use portion.

11. The method of claim 10 wherein:
the normal portion is included within a normal partition; and,
the intended use portion is included within an intended use partition.

12. The method of claim 8 wherein:
the at least one specific intended use includes at least one of audio editing, video editing and photography.

* * * * *